(12) United States Patent
Boyd (10) Patent No.: US 12,173,559 B2
(45) Date of Patent: *Dec. 24, 2024

(54) SYSTEMS AND METHODS FOR WINDOW SETTING ADJUSTMENT

(71) Applicant: Tyco Fire & Security GmbH, Neuhausen am Rheinfall (CH)

(72) Inventor: Andrew M. Boyd, Wichita, KS (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,387

(22) Filed: Apr. 11, 2023

(65) Prior Publication Data

US 2023/0313609 A1 Oct. 5, 2023

Related U.S. Application Data

(63) Continuation of application No. 17/216,242, filed on Mar. 29, 2021, now Pat. No. 11,639,633, which is a continuation of application No. 15/979,136, filed on May 14, 2018, now Pat. No. 10,961,774.

(60) Provisional application No. 62/668,082, filed on May 7, 2018.

(51) Int. Cl.
| | |
|---|---|
| *E06B 9/68* | (2006.01) |
| *E06B 9/32* | (2006.01) |
| *F24F 11/30* | (2018.01) |
| *F24F 110/10* | (2018.01) |
| *G05B 15/02* | (2006.01) |

(52) U.S. Cl.
CPC .............. *E06B 9/68* (2013.01); *E06B 9/32* (2013.01); *E06B 2009/6818* (2013.01); *F24F 11/30* (2018.01); *F24F 2110/10* (2018.01); *G05B 15/02* (2013.01)

(58) Field of Classification Search
CPC ...... E06B 9/68; E06B 9/32; E06B 2009/6818; E06B 2009/6827; F24F 11/30; F24F 2110/10; F24F 11/63; F24F 11/52; F24F 11/58; F24F 2110/20; F24F 2130/10; G05B 15/02

See application file for complete search history.

(56) References Cited

U.S. PATENT DOCUMENTS

| | | | |
|---|---|---|---|
| 7,389,806 B2 | 6/2008 | Kates | |
| 8,836,263 B2 | 9/2014 | Berman et al. | |
| 9,194,167 B2 * | 11/2015 | Gassion | .................... E06B 9/26 |
| 9,638,978 B2 * | 5/2017 | Brown | .................... G05B 15/02 |
| 9,708,852 B2 * | 7/2017 | Cascia | .................... F24F 11/54 |
| 9,869,124 B2 * | 1/2018 | Hall | ........................ E06B 9/308 |
| 9,938,765 B2 | 4/2018 | Berman et al. | |
| 10,017,985 B2 | 7/2018 | Lundy et al. | |
| 10,392,860 B2 | 8/2019 | Barnett | |
| 10,961,774 B2 * | 3/2021 | Boyd | ........................ E06B 9/68 |

(Continued)

*Primary Examiner* — Ramesh B Patel
(74) *Attorney, Agent, or Firm* — Fletcher Yoder, P.C.

(57) ABSTRACT

The present disclosure relates to a thermal management system configured to control a temperature of a building and having a controller configured to determine an adjustment to a window setting of the building based on current weather data, forecasted weather data, or both. The thermal management system also includes a display configured to display instructions related to the adjustment.

20 Claims, 6 Drawing Sheets

(56) References Cited

U.S. PATENT DOCUMENTS

| | | | |
|---|---|---|---|
| 11,639,633 B2* | 5/2023 | Boyd | E06B 9/32 |
| | | | 160/7 |
| 11,871,901 B2* | 1/2024 | Shelton, IV | G16H 40/67 |
| 2006/0185799 A1* | 8/2006 | Kates | F24F 11/523 |
| | | | 160/5 |
| 2009/0076779 A1* | 3/2009 | Simmons | F24F 11/62 |
| | | | 703/1 |
| 2014/0151456 A1* | 6/2014 | McCurnin | G05D 23/1905 |
| | | | 236/51 |
| 2014/0236323 A1* | 8/2014 | Brown | G05B 15/02 |
| | | | 700/90 |
| 2015/0225999 A1* | 8/2015 | Berman | F24F 11/62 |
| | | | 700/275 |
| 2015/0234369 A1 | 8/2015 | Wen et al. | |
| 2015/0370927 A1 | 12/2015 | Flaherty et al. | |
| 2016/0047164 A1* | 2/2016 | Lundy | E06B 9/68 |
| | | | 160/5 |
| 2016/0261793 A1* | 9/2016 | Sivan | G06V 40/166 |
| 2016/0333638 A1* | 11/2016 | Cascia | G05B 15/02 |
| 2017/0168472 A1 | 6/2017 | Ando et al. | |
| 2017/0192402 A1* | 7/2017 | Karp | G06F 9/541 |
| 2018/0030780 A1 | 2/2018 | Barnett | |
| 2018/0307114 A1 | 10/2018 | Brown et al. | |

\* cited by examiner

SYSTEMS AND METHODS FOR WINDOW SETTING ADJUSTMENT

CROSS REFERENCE TO RELATED APPLICATIONS

This is a continuation application of U.S. patent application Ser. No. 17/216,242, entitled "HVAC SYSTEM HAVING WINDOW SETTING ADJUSTMENT," filed Mar. 29, 2021, which is a continuation application of U.S. patent application Ser. No. 15/979,136, entitled "SYSTEMS AND METHODS FOR WINDOW SETTING ADJUSTMENT," filed May 14, 2018, which claims priority from and the benefit of U.S. Provisional Application No. 62/668,082, entitled "SYSTEMS AND METHODS FOR WINDOW SETTING ADJUSTMENT," filed May 7, 2018, each of which is hereby incorporated by reference in its entirety for all purposes.

BACKGROUND

The present disclosure relates generally to heating, ventilation, and air conditioning systems. A wide range of applications exist for heating, ventilation, and air conditioning (HVAC) systems. For example, residential, light commercial, commercial, and industrial systems are used to control temperatures and air quality in residences and buildings. Such systems often are dedicated to either heating or cooling, although systems are common that perform both of these functions. Very generally, these systems operate by implementing a thermal cycle in which fluids are heated and cooled to provide the desired temperature in a controlled space, typically the inside of a residence or building. Similar systems are used for vehicle heating and cooling, and as well as for general refrigeration. In many HVAC systems, sunlight and external weather may affect internal conditions of a building.

SUMMARY

The present disclosure relates to a thermal management system configured to control a temperature of a building and having a controller configured to determine an adjustment to a window setting of the building based on current weather data, forecasted weather data, or both. The thermal management system also includes a display configured to display instructions related to the adjustment.

The present disclosure also relates a non-transitory, computer readable medium including instructions, wherein the instructions are configured to be executed by a processor to perform operations including: receiving a set of data indicative of a weather condition of an external environment of a building; determining a window setting adjustment of the building based on the set of data; and displaying, via a display device, instructions to perform the window setting adjustment.

The present disclosure further relates to a heating and cooling system including a thermal management system configured to set a set-point temperature of a building, a first sensor configured to detect a weather condition of an external environment of the building, and a second sensor configured to detect an actual temperature of the building. The thermal management system is configured to determine instructions for a window setting adjustment of the building based on the set-point temperature, the weather condition, and the actual temperature

DETAILED DESCRIPTION

The present disclosure is directed to heating, ventilation, and air conditioning (HVAC) system that may include a thermal management system, such as a thermostat, configured to direct users to adjust a window setting, such as by adjusting window coverings and/or opening or closing a window. For example, in some instances, building occupants may have window coverings set to allow external weather conditions, such as sunlight, to heat up portions of the building above a set-point temperature, which may decrease an efficiency of the HVAC system. Accordingly, the disclosed embodiments include a thermostat configured to aggregate weather data and notify a building occupant, or user, to adjust a window setting based on the weather data. Particularly, the thermostat may display instructions via a display device to guide users to adjust window settings. In this manner, if weather conditions of an external environment are favorable, the thermostat may guide users, via instructions or suggested actions, to adjust window settings to permit the weather of the external environment to affect internal conditions of the building in a beneficial manner. Similarly, if weather conditions of the external environment are adverse, the thermostat may guide users to adjust window settings to block or restrict the weather of the external environment from affecting internal conditions of the building in an undesirable manner. Thus, the weather conditions may be utilized to help condition the building such as by permitting sunlight to enter and heat the building, such as when heating is desired, and/or by permitting external air to enter and condition the building, such as when cooling is desired, thereby increasing an efficiency of the HVAC system.

Figure 1:
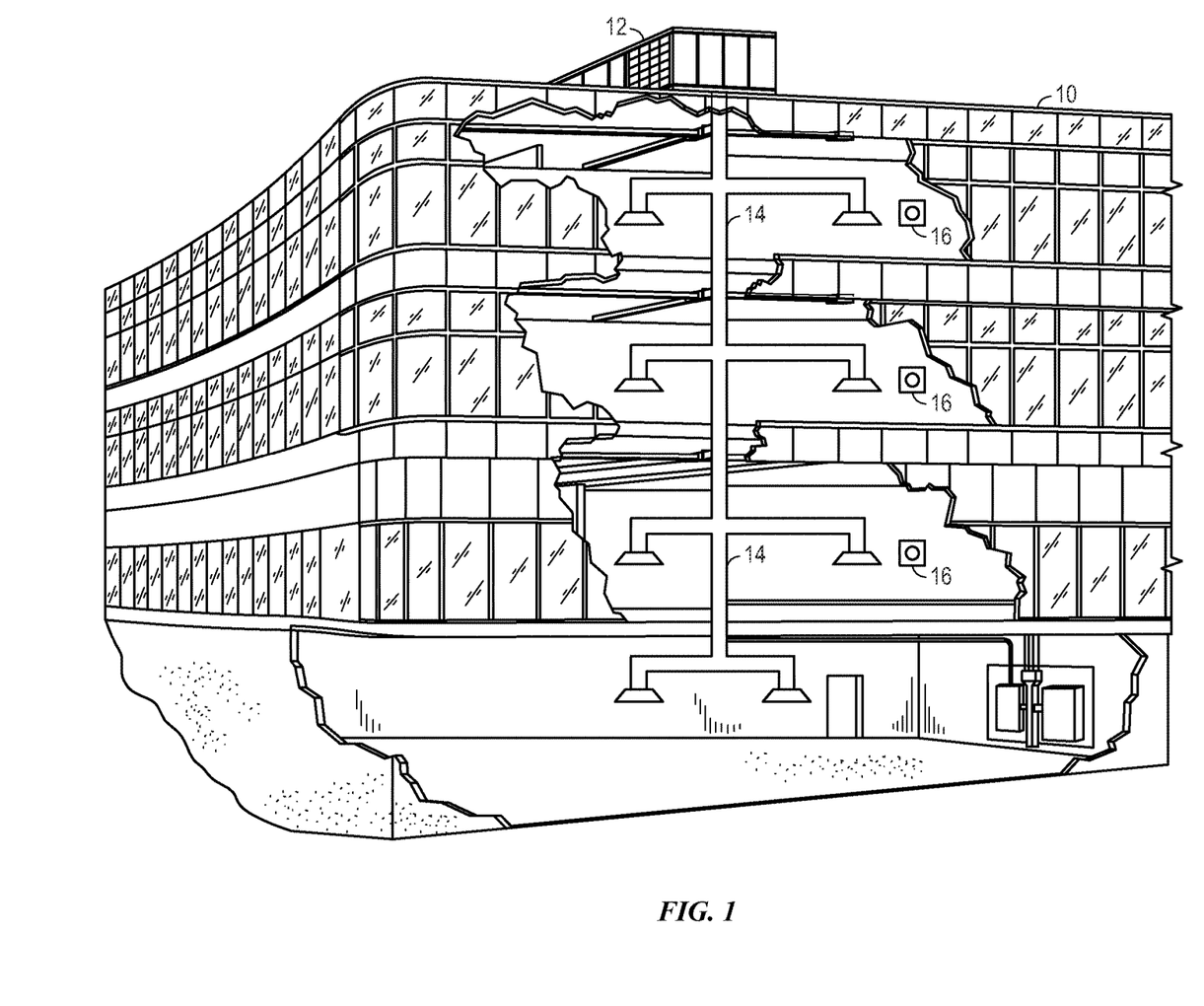
FIG. 1 is a perspective view of an embodiment of a heating, ventilation, and air conditioning (HVAC) system for building environmental management that may employ one or more HVAC units, in accordance with aspects of the present disclosure.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
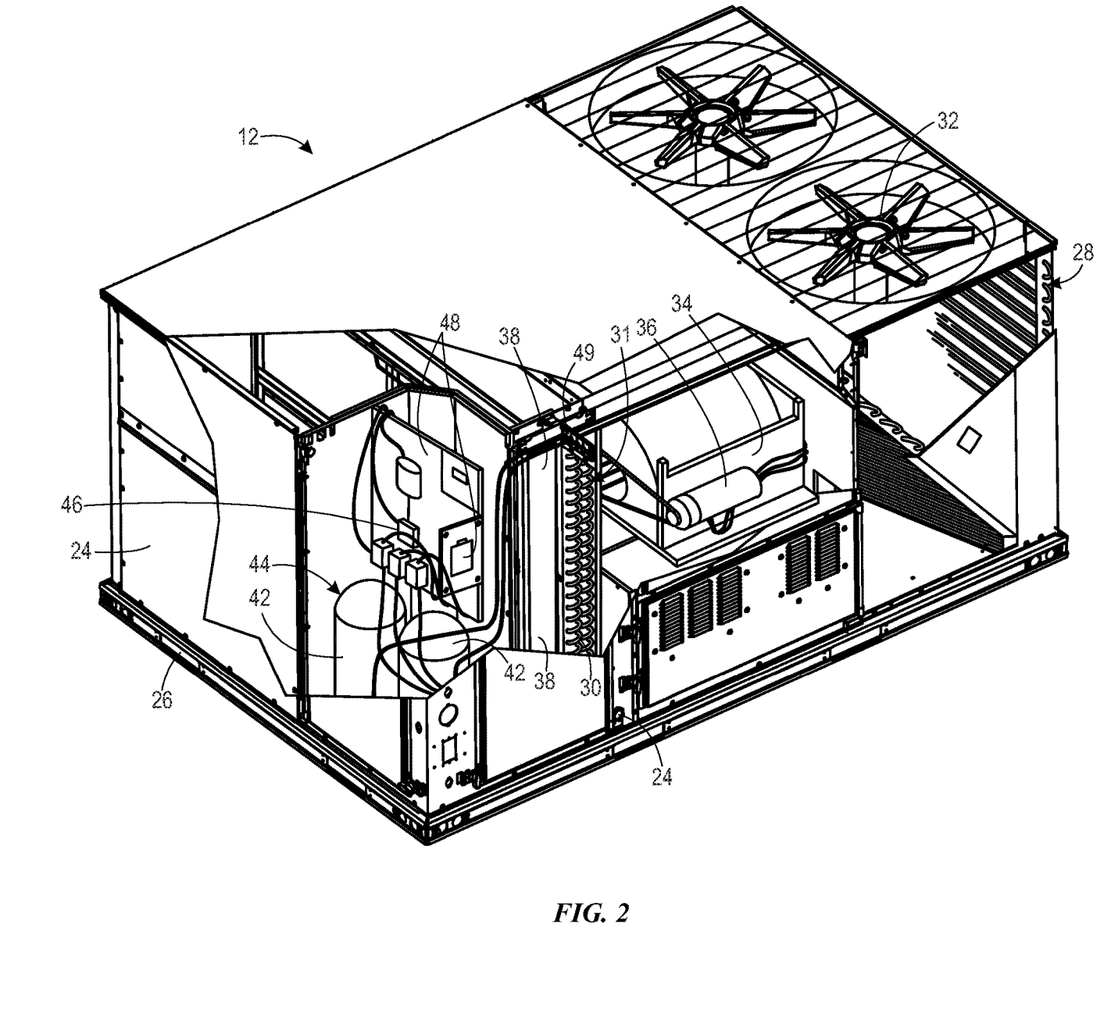
FIG. 2 is a perspective view of an embodiment of an HVAC unit of the HVAC system of FIG. 1, in accordance with aspects of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
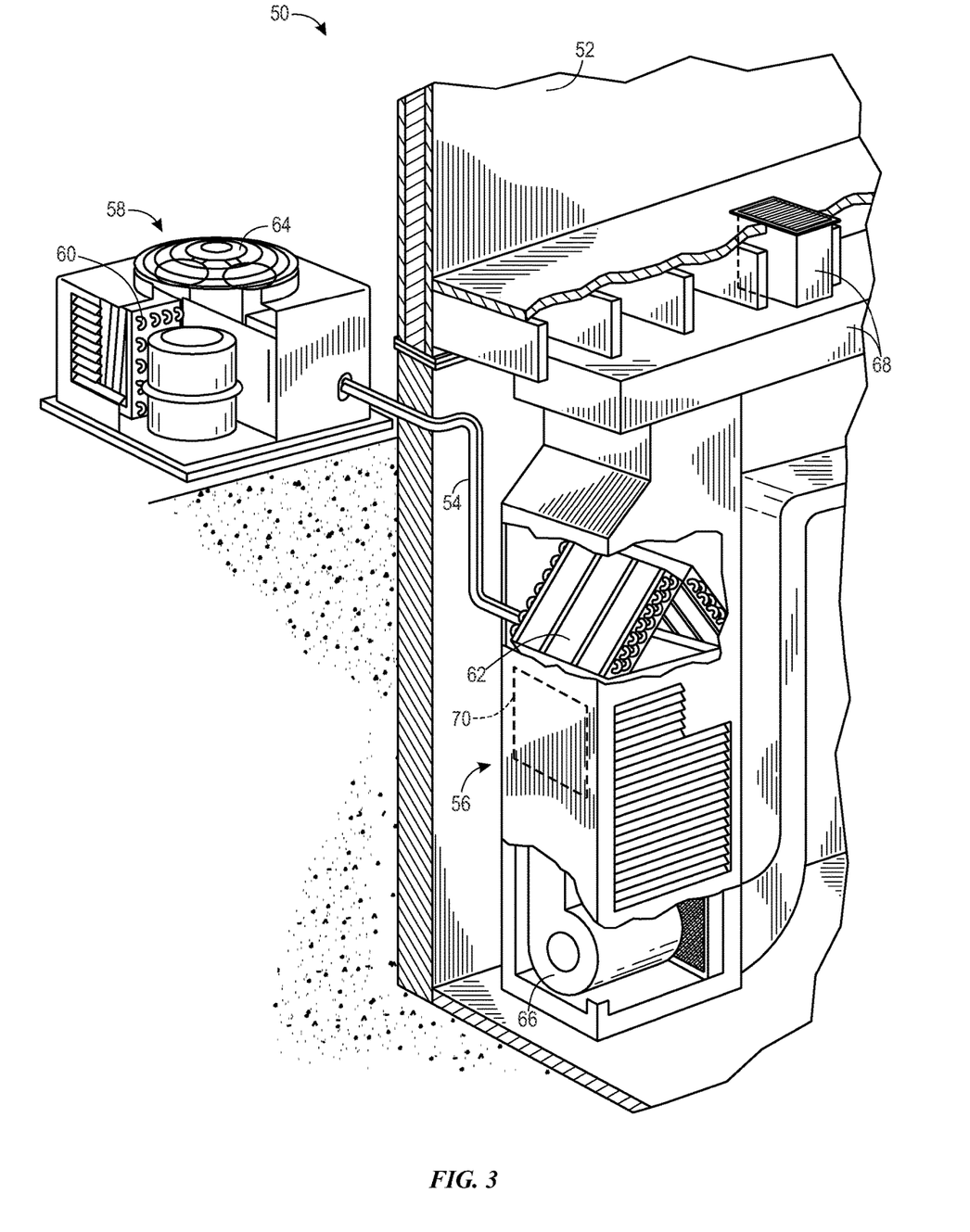
FIG. 3 is a perspective view of an embodiment of a residential split heating and cooling system, in accordance with aspects of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
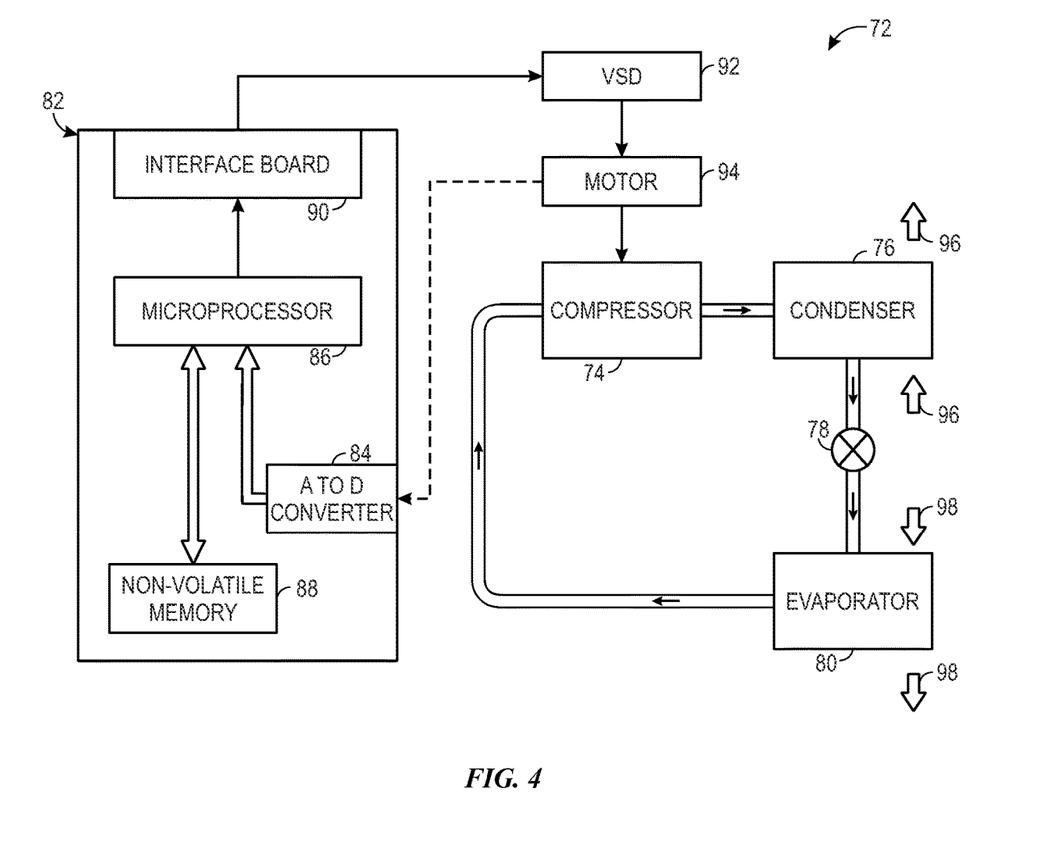
FIG. 4 is a schematic view of an embodiment of a vapor compression system that may be used in an HVAC system, in accordance with aspects of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed below, an HVAC system, such as the HVAC unit 12, the residential heating and cooling system 50, and/or the vapor compression system 72, may utilize a thermostat, such as the control device 16, to guide users to adjust window settings of a building to increase an efficiency of the HVAC system in conditioning a space within the building, such as by providing instructions or suggestion actions to adjust window settings.

Figure 5:
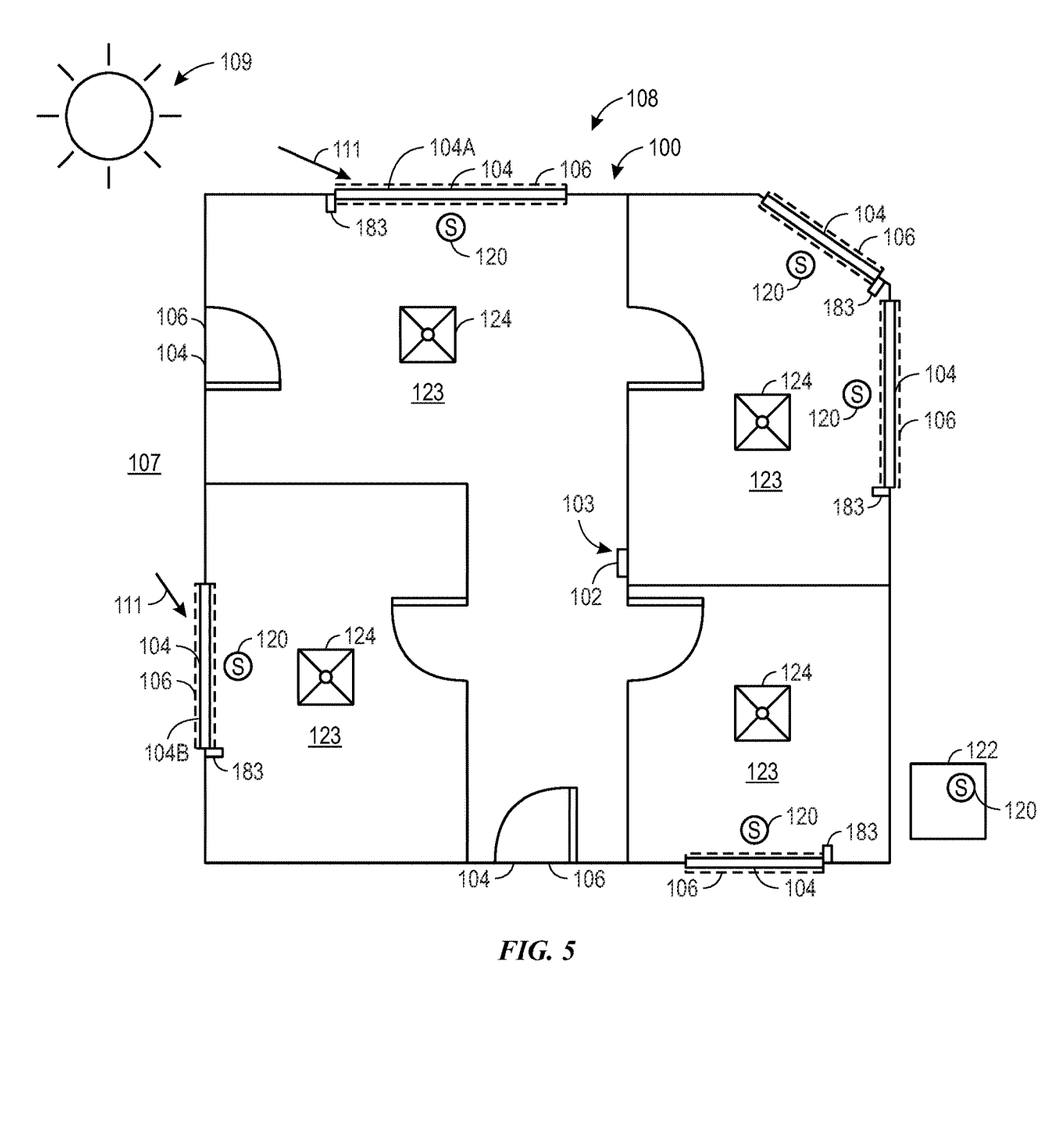
FIG. 5 is a perspective view of an embodiment of a floor plan that may utilize a thermal management system to provide instructions to adjust window settings, in accordance with aspects of the present disclosure.

To illustrate, FIG. 5 is a plan view of a building 100 that may utilize thermal management system, such as a thermostat 102, to guide users, via a display 103, to adjust window settings, such as by providing instructions or suggestion actions to open/close windows 104 and/or to adjust window coverings 106 of the windows 104. In this manner, external weather conditions may be utilized to increase an energy efficiency of an HVAC system conditioning a space of the building 100.

As used herein, windows 104 may refer to a portion of an outer wall of the building 100 that may connect an external environment 107 of the building 100 to an interior of the building 100. For example, windows 104 may refer to paned windows, doors, door windows, skylights, and so forth. Further, window coverings 106 may refer to any suitable window covering that is configured to control an amount of light that may travel through the windows 104 of the building 100, such as curtains, drapes, blinds, shutters, shades, screens, boarding, any other suitable and/or adjustable window covering, or any combination thereof. Still further, weather of the external environment 107 of the building 100 may refer to temperature, precipitation, sunlight, cloud cover, humidity level, wind speed/direction, and so forth, of the external environment 107.

The building 100 may utilize a heating and cooling system 108, such as a heating ventilation, and air conditioning (HVAC) system, to heat, cool, dehumidify, and generally condition the building 100 according to a set-point temperature and/or humidity level. As discussed herein, external weather conditions may be utilized via the windows 104 and window coverings 106 to help the heating and cooling system 108 to condition the building 100 in a desired manner. For example, when the heating and cooling system 108 is in a heating mode and it is a sunny day, the thermostat 102 may suggest and/or guide users to open one or more of the window coverings 106 to allow sunlight to heat the interior building 100 via solar radiation. Correspondingly, when the heating and cooling system 108 is in a cooling mode and it is a sunny day, the thermostat 102 may suggest and/or guide users to close one or more of the window coverings 106 to block the sunlight from heating the interior of the building 100 via solar radiation. Further, in certain embodiments, a temperature and/or humidity level of the external environment 107 may be conducive to helping the heating and cooling system 108 condition interior spaces of the building. In such embodiments, the thermostat 102 may similarly suggest and/or guide the users to open the windows 104 to allow external air to enter the building 100.

In some embodiments, the thermostat 102 may guide users to adjust the window coverings 106 of windows 104 depending on respective positions and orientations of the windows 104 relative to the position of the Sun 109. For example, as the Sun 109 may generally rise in the East and set in the West, window coverings 106 of windows 104 that are generally exposed and oriented towards the East may be adjusted to block and/or allow sunlight in the morning. Correspondingly, window coverings 106 of windows 104 that are generally exposed and oriented towards the West may be adjusted to block and/or allow sunlight in the afternoon. For example, as illustrated in the current embodiment, a first window 104a and a second window 104b may be positioned to receive some amount of sunlight as indicated by arrows 111. Accordingly, the thermostat 102 may guide users via the display 103 to adjust the respective window coverings 106 of the first window 104a and the second window 104b depending on whether the heating effect of the Sun 109 is desired to condition the interior of the building 100. Indeed, as discussed below, in certain embodiments, the thermostat 102 may include stored information regarding the position and orientation of the windows 106 relative to a position of the Sun 109 throughout the day to determine when to guide users to adjust the window coverings 106 of particular windows 104.

In certain embodiments, the heating and cooling system 108 may include multiple sensors 120, which may be used to detect, sense, and/or measure a humidity level, a temperature, and/or a light intensity of the building 100 and/or of the external environment 107. Indeed, the sensors 120 may include humidity sensors, temperature sensors, and/or light sensors. Particularly, in some embodiments, an outdoor unit 122, such as a condensing unit, an outdoor heat exchanger, and/or a heat pump, of the heating and cooling system 108 may include sensors 120 configured to measure temperature and humidity of the external environment 107. Utilizing the sensors 120 of the outdoor unit 122, the thermostat 102 may determine a temperature and/or humidity level of the external environment 107. If the temperature and/or humidity level of the external environment 107 is conducive to conditioning the interior of the building 100, as discussed below, the thermostat 102 may guide users to open the windows 104 to allow air from the external environment 107 to enter the building 100. Correspondingly, if the temperature and/or humidity level of the external environment 107 is not conducive to conditioning the interior of the building 100, as discussed below, the thermostat 102 may guide users to close the windows 104 to block air from the external environment 107 from entering the building 100.

In some embodiments, the heating and cooling system 108 may be configured to provide individualized conditioned air to certain areas 123, rooms, or zones, of the building 100. To this end, the building 100 may include a multiple air diffusers 124 disposed in the certain areas of the building 100. In some embodiments, the air diffusers 124 may be associated with a zoning system, a variable air volume (VAV) system, and/or a constant air volume (CAV)

system. Indeed, each area 123 of the building 100 may include one or more air diffusers 124 configured to provide individualized conditioned air based on a temperature and/or humidity of the area 123. Further, as used herein, it should be understood that the term, "based on," may be defined as "based at least in part on," in some embodiments. Moreover, in certain embodiments, each air diffuser 124 may be associated with one or more sensors 120 configured to measure a temperature and/or humidity of the area 123, as illustrated. For example, the air diffusers 124 may provide cool air if the sensors 120 detect an actual temperature of a particular area 123 to be higher than a set-point temperature. Correspondingly, the air diffusers 124 may provide warm air if the sensors 120 detect an actual temperature of a particular area 123 to be lower than the set-point temperature. Further, in certain embodiments, the sensors 120 may include light sensors configured to detect an intensity of sunlight, such as ultra violet light, passing into the area 123 to determine whether the window coverings 106 are positioned to allow sunlight to pass into the area 123. Keeping this in mind, when the thermostat 102 guides or suggests to a user to adjust, open, or close a window covering 106, the thermostat 102 may determine whether the window covering 106 has actually been adjusted, opened, or closed by determining the amount of light in the area 123 via the sensors 120. In this manner, the thermostat 102 may remind the user to adjust, open, or close the window covering 106 if the user did not notice the suggested instructions or chose not to follow the suggested instructions. Additionally or alternatively, the thermostat 102 may provide conditioned air via the air diffuser 124 if the sensors 120 detects that the user did not notice the suggested instructions or chose not to follow the suggested instructions.

Figure 6:
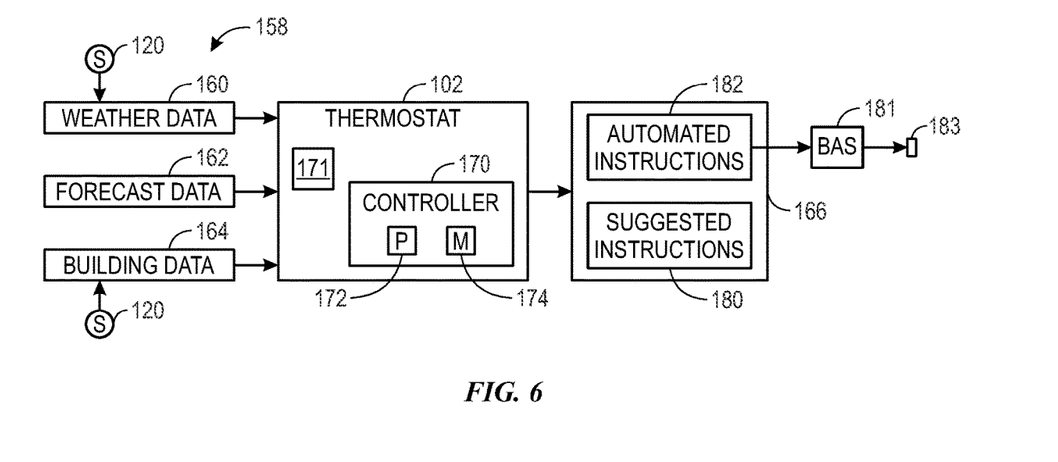
FIG. 6 is a block diagram of an embodiment of the thermal management system of FIG. 5, in accordance with aspects of the present disclosure.

FIG. 6 is a block diagram of a portion of the heating and cooling system 108 that may be utilized to guide users to adjust the window settings, such as by providing instructions or suggested actions. Generally, the thermostat 102 may receive data 158, such as weather data 160 indicative if a weather condition of the external environment 107, forecast data 162 indicative of forecasted weather of the external environment 107, and/or building data 164 indicative of a temperature/humidity and other information associated the building 100, as discussed below. Based on the received data, the thermostat 102 may output instructions 166.

To this end, the thermostat 102 may include a controller 170, such as a computer-based controller, which may have a processor 172, such as a micro-processor, a memory 174, and executable code stored thereon. The processor 172 may be any general purpose or application-specific processor. The memory 174 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by a processor, such as the processor 172, or by any general purpose or special purpose computer or other machine with a processor, such as the processor 172.

As mentioned above, the thermostat 102 may receive the weather data 160 indicative of a weather status the external environment 107. In some embodiments, the weather data 160 may originate from the sensor 120 included in the outdoor unit 122. Additionally, or in the alternative, the weather data 160 may originate from one or more sensors 120 located in a similar geographic location as the building 100. Particularly, the weather data 160 may include data indicative of temperature, humidity, precipitation, cloud cover, wind direction/speed, and so forth of the external environment 107.

Further, as also mentioned above, the thermostat 102 may receive the forecast data 162 indicative of forecasted weather of the external environment 107. For example, the forecast data 162 may include predicted weather conditions, such as cloud cover, UV radiation, temperature, humidity, precipitation, and so forth. In certain embodiments, the weather data 160 and/or the forecast data 162 may include a position of the Sun 109 relative to the building 100. In certain embodiments, the thermostat 102 may receive the forecast data 162 from an online source, such as from a weather reporting and/or forecasting website or service. Indeed, the thermostat 102 be communicatively coupled to the internet via a communication system 171. The communication system 171 may communicate through a wireless network, such as wireless local area networks [WLAN], wireless wide area networks [WWAN], near field communication [NFC], Wi-Fi, or Bluetooth. In some embodiments, the communication system 171 may communicate through a wired network, such as local area networks [LAN] or wide area networks [WAN]. In certain embodiments, the thermostat 102 may be communicatively coupled to the sensors 120 via the communication system 171.

Additionally, the thermostat 102 may receive the building data 164, which may be indicative of temperature and humidity the building 100, and other information regarding the building 100. For example, the thermostat 102 may receive the building data 164 from the one or more sensors 120 indicative of an indoor temperature of the building 100 and/or an indoor humidity level of the building 100. In some embodiments, the building data 100 may include data indicative of the set-point temperature of the building 100, which may be manually input into the thermostat 102, such as via the display 103 or other input devices. Further, the building data 164 may include data indicative of a geographic location of the building 100 and respective positions and orientations of the windows 104. In certain embodiments, depending at least in part on the geographic location of the building 100, the thermostat 102 may determine a location of the Sun 109 relative to the building 100, and more specifically, relative to the windows 104 of the building 100 during certain times of the year/day. Indeed, certain windows 104 may be oriented to receive sunlight during certain time periods of the day and year depending at least in part on the location and orientation of the windows 104. Particularly, as used herein, the orientation of the windows 104 may refer to a cardinal direction orientation, such as North, East, South, and West, and/or an angle of elevation/depression of the windows 104. Moreover, as used herein, the direction in which the windows 104 are facing may refer to the direction of the normal vector of the exterior side of the windows 104. In certain embodiments, the building data 164 indicative of a location and orientation of the windows 104 may be manually input to the thermostat 102 during installation of the thermostat 102. Similarly, in certain embodiments, the geographic location of the building 100 may be manually input to the thermostat 102 during installation of the thermostat 102. In certain embodiments, the geographic location of the building 100 may be detected automatically, such as by utilizing a global positioning system (GPS), Wi-Fi, service set identifiers (SSID), wireless access points, and so forth. Indeed, the building data 164 may be received from a variety of sources, as described above.

The thermostat 102 may aggregate the data 158 and analyze the data 158 to determine the instructions 166 to adjust window settings, such as to adjust certain window coverings 106 or to open/close windows 104. Generally, the instructions 166 to adjust the window settings may be based on a comparison of the actual temperature of the building 100 and the set-point temperature, and whether the weather of the exterior environment 107 is conducive to conditioning the building 100. That is, the thermostat 102 may utilize the data 158 to determine whether the actual temperature of the building 100, or areas 123 of the building 100, is above, below, or substantially even with the set-point temperature, and may output the instructions 166 accordingly.

As an example, if the actual temperature is below the set-point temperature and the weather of the external environment 107 is conducive to raising the actual temperature of the building 100, the instructions 166 may include instructions to utilize the weather of the external environment 107 to help raise the actual temperature, such as by opening windows 104 and/or window coverings 106. Correspondingly, if the actual temperature is below the set-point temperature and the weather of the external environment 107 is not conducive to raising actual temperature of the building 100, the instructions 166 may include instructions to not utilize the climate of the external environment 107, such as by closing the windows 104 and/or window coverings 106.

As a further example, if the actual temperature is above the set-point temperature and the weather of the external environment 107 is conducive to lowering the actual temperature of the building 100, the instructions 166 may include instructions to utilize the weather of the external environment 107 to help lower the actual temperature, such as by opening windows 104 and/or window coverings 106. Correspondingly, if the actual temperature is above the set-point temperature and the weather of the external environment 107 is not conducive to lowering the actual temperature of the building 100, the instructions 166 may include instructions to not utilize the climate of the external environment 107, such as by closing the windows 104 and/or window coverings 106.

In certain embodiments, the thermostat 102 may utilize the weather data 160 and the forecast data 162 to determine whether and which windows 104 should be opened or closed. For example, as discussed above, the weather data 160 and/or the forecast data 162 may be indicative of cloud cover, UV radiation, temperature, humidity, precipitation, and so forth, of the external environment 107. In certain embodiments, if the weather data 160 and/or the forecast data 162 indicates that external weather condition is adverse, such as adverse precipitation, temperatures, or humidity levels, the instructions 166 may indicate that the windows 104 should be closed. For example, adverse precipitation may include rain, snow, hail, storms, and the like, adverse temperatures may include temperatures that may affect the actual temperature to move away from the set-point temperature, and adverse humidity levels may include high humidity levels and/or low humidity levels, which may be set according to user preference. Similarly, if the weather data 162 and/or the forecast data 162 indicates that external environment weather conditions are favorable, such as favorable temperatures and humidity levels, the instructions 166 may indicate that the windows 104 should be opened. For example, favorable weather conditions may include dry weather, or no precipitation, favorable temperatures may include temperatures that may cause the actual temperature within the building 100 to move towards the set-point temperature, and favorable humidity levels may be set according to user preference.

In certain embodiments, the weather data 160 and the forecast data 162 may be disparate, which may be due in part at least to the different sources from which they are obtained. For example, the forecast data 162 may indicate that the external environment weather conditions are favorable while the weather data 160 may indicate that the external environment weather conditions are adverse, or vice versa. Indeed, as discussed above, the weather data 160 may be gathered from the sensors 120, while the forecast data 162 may be gathered from an online source. In such embodiments, the thermostat 102 may prioritize the weather data 160 over the forecast data 162. In other words, if the weather data 160 and the forecast data 162 are disparate, as described above, the thermostat 102 may base the instructions 166 on the weather data 160 as oppose to the forecast data 162.

Further, as discussed above in certain embodiments, the forecast data 162 may include a predicted, or future, weather of the external environment. Accordingly, in certain embodiments, the instructions 166 may indicate to open or close the windows to prepare for certain future weather conditions, such as by opening or closing the window 104.

In certain embodiments, the thermostat 102 may utilize the building data 164 to determine whether and which window coverings 106 should be opened or closed, such as to block or allow sunlight through windows 104. For example, as discussed above, the building data 164 may be indicative of the location of the building 100, the movement of the Sun 109 relative to the building 100, and movement of the Sun 109 relative to respective positions and orientations of the windows 104. To illustrate, based on the position of the Sun 109 during certain points of the day and year relative to the geographic location of the building 100 and the windows 104 of the building 100, the instructions 166 may include instructions to open window covering 106 of a certain window 104 during a certain time period to either block sunlight from entering the building 100 through the window 104 and/or to allow sunlight to enter the building 100 through the window 104. For example, in certain embodiments, the Sun 109 may be positioned to direct UV radiation at a first window 104, or set of windows 104, in the morning, and may be position to direct UV radiation at a second window 104, or set of windows 104, in the afternoon. In such embodiments, if the heating and cooling system 108 is in a heating mode, such as during winter, the instructions 166 may include instructions to open a window covering 106 of first window 104 in the morning and to open a window covering 106 of the second window 104 in the afternoon. That is, in certain embodiments, the thermostat 102 may communicate a schedule for a certain time period, such as a day, a week, a month, describing window setting adjustments for respective windows 104. Additionally, or in the alternative, the thermostat 102 may communicate instructions contemporaneously. For example, the thermostat 102 may communicate in the morning to adjust the window coverings 106 of the first window 104, and may communicate in the afternoon to adjust the window coverings 106 of the second window 104.

Generally, the instructions 166 may include instructions to allow sunlight to enter the building 100 if an actual temperature of the building 100 is below the set-point temperature. Similarly, the instructions 166 may include instructions to block sunlight from entering the building 100 if an actual temperature of the building 100 is above the set-point temperature. In certain embodiments, the window coverings 106 may be configured to be adjusted to a position between a fully open position and a fully closed position. For example, if the window coverings 106 are blinds, shutters, or other window coverings configured to be positioned at various angles between fully open and fully closed, the building data 164 may be indicative of the same. In such embodiments, the instructions 166 may include instructions to position the window coverings 106 at a certain position between an open position and a closed position. In some embodiments, the certain position between the open position and the closed position may be based at least in part on a position of the Sun 109 relative to the window 104. For example, if 0° is a closed position and 180° is an open position, the thermostat 102 may determine that one of 45°, 90°, or 135° will provide the most ideal sun exposure.

As discussed in detail above, the thermostat 102 may aggregate the data 158 and determine instructions 166 indicative of an adjustment of a window setting, such as the window 104 and/or the window coverings 106. Particularly, in certain embodiments, the instructions 166 may include suggested instructions 180 and automated instructions 182. The suggested instructions 180 that may be displayed, such as via the display 103 of the thermostat 102. Particularly, the suggested instructions 180 may be utilized to communicate the instructions 166 to a user of the thermostat 102. That is, the user may observe the suggested instructions 180 and may proceed to adjust a window setting as directed by the suggested instructions 180.

In some embodiments, the thermostat 102 may also receive data indicative of user preferences. For example, the user preferences may include a schedule, which may implement a first set-point temperature during the day time and a second set-point temperature during the night time. Accordingly, the thermostat 102 may determine the instructions 166 based on the user preferences, such as to provide instructions according to a first set-point temperature during a first time period and according to a second set-point temperature during a second time period, as discussed herein.

Further, in certain embodiments, the building 100 may include a building automation system (BAS) 181. The BAS 181 may be a centralized control system of the building 100. Particularly, the BAS 181 may provide control to the heating and cooling system 108, a lighting system, a security system, and/or other systems of the building 100. In such embodiments, the automated instructions 182 may be implemented via the BAS 181. That is, the thermostat 102 may send data indicative of the automated instructions 182 to the BAS 181. Based on the automated instructions, the BAS 181 may adjust the window settings via actuators 183. For example, in certain embodiments, the BAS 181 may be communicatively coupled to the actuators 183, which are configured to adjust the window settings of the windows 104 and window coverings 106 of the building 100. That is, the actuators 183 may be configured to adjust a position of the window coverings 106 and/or to open and close the windows 104.

Figure 7:
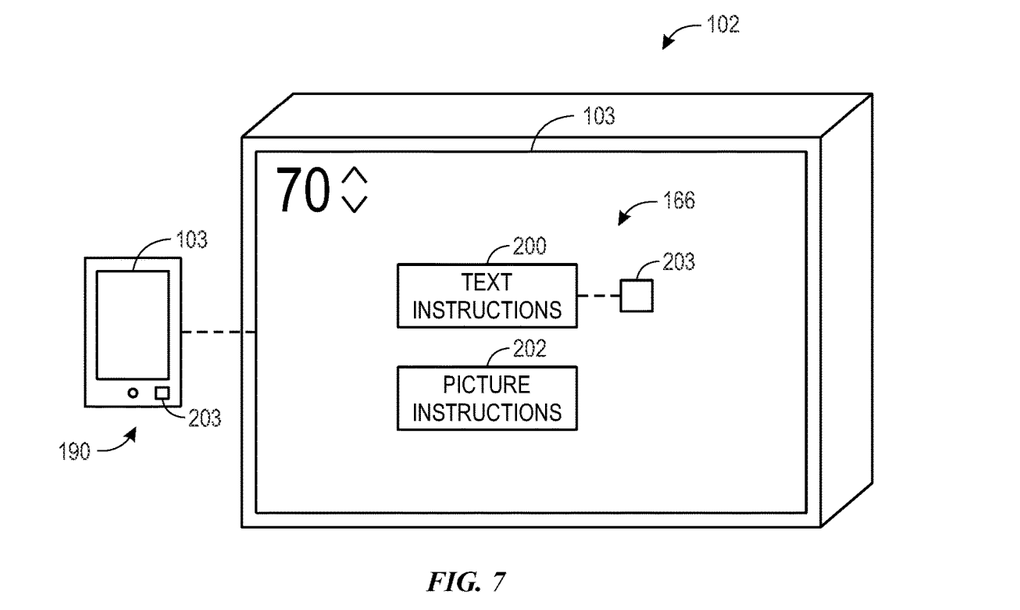
FIG. 7 is a perspective view of an embodiment of the thermal management system of FIG. 5, in accordance with aspects of the present disclosure.

FIG. 7 is a perspective view of a thermal management system, which may include the thermostat 102 and/or a computing device 190, such as a cellular phone, laptop, tablet, desktop, network, and so forth. That is, in certain embodiments, the display 103, which may display the instructions 166 may be included in any suitable thermal management system, which may be utilized through an application on the computing device 190 and/or may be included in the thermostat 102, as described above.

As shown, in certain embodiments, the instructions 166 may be in the form of text instructions 200 and/or may be in the form of picture or image instructions 202. The text instructions 200 may include text to communicate the instructions 166 to a user observing the display 103. By way of example, the text instructions 166 may display text reading, "open the family room window," "close the first East facing window," "open the window covering of the second story dining room window," or any other suitable text instructions that may communicate the window setting adjustment. Further, in certain embodiments, the thermostat 102 may include an audio system 203, which may be configured to emit verbal instructions similar to the text instructions 200. Also, by way of example, the picture instructions 202 may include a plan view of the building 100, such as shown in FIG. 5 and may graphically indicate which window 104 and/or window covering 106 of the building 100 to adjust. For example, in certain embodiments, the picture instructions 202 may include a graphic representation of a particular window 104 and/or window covering 106 that is to be adjusted, as well the position to which it should be adjusted. In certain embodiments, the picture instructions 202 may be displayed in conjunction with the text instructions 200. For example, the picture instructions 202 may display a plan view of the building 100 and may indicate a particular window 104 and/or window covering 106 to adjust, and the text instructions 200 may indicate how to adjust the a particular window 104 and/or window covering 106, such as by opening or closing.

Further, it should be understood that the disclosed embodiments may be applied to any suitable heating and cooling system configured to condition a space, whether it be residential, commercial, industrial, automotive, and so forth.

Accordingly, the present disclosure is directed to providing systems and methods for a thermal management system configured to provide instructions to adjust window settings of windows of a building, such as by opening and/or closing windows and/or by adjusting window coverings of windows. In certain embodiments, the instructions may be communicated via a display of the thermal management system. In this manner, a heating and cooling system associated with the thermal management system may utilize external weather conditions to help condition the building, thereby increasing an efficiency of the heating and cooling system.

While only certain features and embodiments of the present disclosure have been illustrated and described, many modifications and changes may occur to those skilled in the art, such as variations in sizes, dimensions, structures, shapes and proportions of the various elements, values of parameters, such as temperatures or pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system, comprising:
a controller configured to:
receive data indicative of a set-point for an environmental parameter of a space within a building;
receive data indicative of an actual value of the environmental parameter within the space;
receive weather data indicative of current weather data external to the building, forecasted weather data, or both; and
determine a window setting adjustment for at least one window of the building based on the set-point, the actual value, and the weather data.

2. The system of claim 1, wherein the controller is configured to determine instructions for implementing the window setting adjustment.

3. The system of claim 2, wherein the instructions comprise suggested instructions including an action to be performed by a user to implement the window setting adjustment, and the controller is configured to send the suggested instructions to a display configured to display the suggested instructions to the user.

4. The system of claim 3, wherein the controller is configured to send the suggested instructions to a mobile device comprising the display.

5. The system of claim 3, wherein the suggested instructions comprise text instructions, image instructions, or both.

6. The system of claim 2, wherein the instructions comprise automated instructions configured to cause an actuator associated with the at least one window to adjust a window setting of the at least one window in accordance with the window setting adjustment.

7. The system of claim 6, wherein the automated instructions are configured to cause the actuator to open or close the at least one window, adjust a position of a window covering of the at least one window, or both.

8. The system of claim 1, wherein the environmental parameter comprises a temperature within the space, a humidity level within the space, or both.

9. The system of claim 1, wherein the controller is configured to receive the data indicative of the actual value of the environmental parameter within the space from a sensor communicatively coupled to the controller and disposed within the space.

10. The system of claim 9, wherein the controller is configured to receive the weather data indicative of current weather data external to the building from an additional sensor communicatively coupled to the controller and disposed external to the building.

11. The system of claim 9, wherein the controller is configured to receive the weather data indicative of forecasted weather data from an online source.

12. A non-transitory, computer readable medium comprising instructions, wherein the instructions are configured to be executed by a processor to perform operations comprising:
receiving data indicative of a set-point for an environmental parameter within a building;
receiving data indicative of an actual value of the environmental parameter within the building;
receiving weather data indicative of current weather data external to the building, forecasted weather data, or both;
determining a window setting adjustment for a window of the building based on the set-point, the actual value, and the weather data;
determining instructions for implementing the window setting adjustment; and
outputting the instructions.

13. The non-transitory, computer readable medium of claim 12, wherein the operations comprise sending the instructions to an actuator, wherein the instructions are configured to cause the actuator to adjust a window setting of the window to implement the window setting adjustment.

14. The non-transitory, computer readable medium of claim 12, wherein the weather data is indicative of cloud cover, ultraviolet (UV) radiation, temperature, humidity, wind speed, wind direction, and/or precipitation in an external environment surrounding the building.

15. The non-transitory, computer readable medium of claim 12, wherein the operations comprise sending the instructions to a mobile device configured to communicate the instructions to a user, and the instructions comprise text instructions, image instructions, audio instructions, or any combination thereof, configured to guide the user to perform the window setting adjustment.

16. The non-transitory, computer readable medium of claim 15, wherein the window setting adjustment comprises an adjustment to open or close the window, an adjustment to a position of a window covering of the window, or both.

17. A system, comprising:
a controller configured to:
receive data indicative of a set-point for an environmental parameter of a space within a building;
receive data indicative of an actual value of the environmental parameter within the space;
compare the set-point and the actual value;
receive weather data indicative of current weather data external to the building, forecasted weather data, or both; and
determine a window setting adjustment for a window of the building, a window covering of the window, or both based on comparison of the set-point and the actual value and based on the weather data.

18. The system of claim 17, wherein the controller is configured to:
determine automated instructions for implementing the window setting adjustment; and
send the automated instructions to an actuator configured to perform the window setting adjustment.

19. The system of claim 17, wherein the controller is configured to:
determine suggested instructions for implementing the window setting adjustment, wherein the suggested instructions comprise text instructions, image instructions, audio instructions, or a combination thereof; and
send the suggested instructions to a mobile device configured to output the suggested instructions to a user.

20. The system of claim 17, comprising a thermostat configured to be disposed within the building, wherein the thermostat comprises the controller.

* * * * *